United States Patent [19]

Shigemoto

[11] Patent Number: 5,106,692
[45] Date of Patent: Apr. 21, 1992

[54] LAMINATED STRUCTURE COMPRISING 4-METHYLPENTENE-1 BONDED TO THERMOPLASTIC RESIN LAYER

[75] Inventor: Hiromi Shigemoto, Iwakuni, Japan

[73] Assignee: Mitsui Petrochemical Industries, Ltd., Tokyo, Japan

[21] Appl. No.: 420,881

[22] Filed: Oct. 13, 1989

[30] Foreign Application Priority Data

Oct. 17, 1988 [JP] Japan .................... 63-260771

[51] Int. Cl.$^5$ .................. B32B 27/36; B32B 27/08
[52] U.S. Cl. ...................... 428/412; 428/475.8; 428/476.9; 428/483; 428/516; 426/127
[58] Field of Search .............. 428/412, 516, 476.9, 428/475.8, 483

[56] References Cited

U.S. PATENT DOCUMENTS 4,210,686  7/1980  Gajewski et al.
4,386,991  6/1983  Shiomi et al. .................... 428/516
4,542,188  9/1985  van der Heijden .............. 525/240

FOREIGN PATENT DOCUMENTS 0204324  12/1986  European Pat. Off. .

*Primary Examiner*—P. C. Sluby
*Attorney, Agent, or Firm*—Sherman and Shalloway

[57] ABSTRACT

A laminate comprising
 (A) a layer of a 4-methyl-1-pentene polymer,
 (B) a layer of a polymer composition comprising
  (a) 40 to 98% by weight of an ethylene/alpha-olefin random copolymer containing 30 to 95 mole % of ethylene units,
  (b) 0.1 to 20% by weight of a polyolefin modified with an unsaturated carboxylic acid or its derivative, and
  (c) 1 to 50% by weight of a tackifier, the proportions of components (a), (b) and (c) being based on the total weight of components (a), (b) and (c), and
 (C) a layer of a thermoplastic resin, the layers (A), (B) and (C) being laminated in the sequence stated.

9 Claims, No Drawings

LAMINATED STRUCTURE COMPRISING 4-METHYLPENTENE-1 BONDED TO THERMOPLASTIC RESIN LAYER

This invention relates to a laminate, and more specifically to a laminate having excellent delamination strength, thermal resistance and mechanical strength.

By utilizing its transparency, thermal resistance and chemical resistance, poly(4-methyl-1-pentene) has been used as a coating material for chemical experimentation instruments such as beakers and measuring cylinders, injection syringes, cells for optical measurements, and trays or baking cartons for electronic ovens. Poly(4-methyl-1-pentene) has a high melting point and good thermal resistance but poor heat-sealability. The most general method of improving the heat-sealability of poly(4-methyl-1-pentene) is to bond a resin having a lower melting point than poly(4-methyl-1-pentene) and better heat-sealability, such as polyethylene or polypropylene, to poly(4-methyl-1-pentene). However, polyethylene and polypropylene which are among polyolefins as is poly(4-methyl-1-pentene) have poor adhesion, and direct lamination of both gives no practical product. When an anchor coating agent such as a urethane-type adhesive is coated on a poly(4-methyl-1-pentene) film and a polyethylene film is laminated to it, the laminate has low delamination strength and shows no excellent heat-sealability because the poly(4-methyl-1-pentene) film has poor surface wettability.

It is known to laminate a styrene resin having lower water permeability to a saponification product of an ethylene/vinyl acetate copolymer having excellent gas-barrier property, oil resistance and mechanical strength properties, thereby to produce a laminate having all of these properties. As an adhesive interlayer of this laminate, it is known to use a composition comprising 50 to 99% by weight of a graft-modified ethylene/alpha-olefin random copolymer containing 0.01 to 10% by weight of an unsaturated carboxylic acid or its derivative grafted and having a melt flow rate of 0.1 to 50 g/10 min., a density of 0.85 to 0.90 g/cm$^3$, an ethylene content of 30 to 95 mole % and a crystallinity by X-rays of not more than 40%, and 50 to 1% by weight of a tackifier Japanese Laid-Open Patent Publication No. 241144/1986) and a composition comprising 40 to 98% by weight of an ethylene/alpha-olefin random copolymer having a melt flow rate of 0.1 to 50 g/10 min., an ethylene content of 30 to 95 mole %, a density of 0.85 to 0.90 g/cm$^3$ and a crystallinity by X-rays of not more than 40%, 0.1 to 20% by weight of modified polyethylene having a density of 0.905 to 0.98 g/cm$^3$ and a crystallinity by X-rays of at least 45%, and 1 to 50% by weight of a tackifier (Japanese Laid-Open Patent Publication No. 162539/1986.

None of these patent documents, however, suggest anything on a laminate having poly(4-methyl-1-pentene) as a polymer layer and the adhesion to the polymer layer.

It is an object of this invention to provide a laminate having excellent thermal resistance, mechanical strength and heat sealability and comprising a layer of a 4-methyl-1-pentene polymer.

Another object of this invention is to provide a laminate obtained by laminating a film of 4-methyl-1-pentene polymer to a film of polyethylene or polypropylene by using a specific composition and having high delamination strength and the excellent properties mentioned above.

Other objects of this invention along with its advantages will become apparent from the following description.

According to this invention, the above objects and advantages of the invention are achieved by a laminate comprising (A) a layer of a 4-methyl-1-pentene polymer,
(B) a layer of a polymer composition comprising
  (a) 40 to 98% by weight of an ethylene/alpha-olefin random copolymer containing 30 to 95 mole % of ethylene units,
  (b) 0.1 to 20% by weight of a polyolefin modified with an unsaturated carboxylic acid or its derivative, and
  (c) 1 to 50% by weight of a tackifier, the proportions of components (a), (b) and (c) being based on the total weight of components (a), (b) and (c), and
(C) a layer of a thermoplastic resin, the layers (A), (B) and (C) being laminated in the sequence stated.

In the laminate of this invention, a polymer of 4-methyl-1-pentene is used as layer (A). The 4-methyl-1-pentene polymer may be a homopolymer of 4-methyl-1-pentene or a copolymer of 4-methyl-1-pentene with another alpha-olefin. The other alpha-olefin may be an alpha-olefin having 2 to 20 carbon atoms such as ethylene, propylene, 1-butene, 1-hexene, 1-octene;1-decene, 1-tetradecene and 1-octadecene.

The copolymer is preferably a copolymer comprising at least 85 mole % of 4-methyl-1-pentene as a main component.

Preferably, the 4-methyl-1-pentene polymer has a melt flow rate (MFR$_5$, load: 5 kg, temperature: 260° C.) of 0.5 to 200 g/10 min from the viewpoint of moldability and strength.

The laminate of this invention uses a composition comprising an ethylene/alpha-olefin random copolymer, a tackifier and a polyolefin modified with an unsaturated carboxylic acid or its derivative as interlayer (B).

The ethylene/alpha-olfein random copolymer used in this invention is a random copolymer of ethylene and an alpha-olefin, and has an ethylene content of 30 to 95 mole %. The preferred ethylene content is 40 to 80 mole % in view of the adhesion between the interlayer (B) and the 4-methyl-1-pentene polymer layer.

Examples of the alpha-olefin constituting the ethylene/alpha-olefin random copolymer include those having 3 to 30 carbon atoms, such as propylene, 1-butene, 1-hexene, 4-methyl-1-pentene, 1-octene, 1-decene, 1-tetradecene and 1-octadecene.

These alpha-olefins may be used singly or in combination with each other.

The ethylene/alpha-olefin random copolymer (a) preferably has a melt flow rate (MFR), determined at 190° C. under a load of 2.16 kg, of 0.1 to 50 g/10 minutes. From the viewpoint of moldability, it is more preferably 2 to 50 g/10 min.

The ethylene/alpha-olefin random copolymer preferably has a density of 0 85 to 0.90 g/cm$^3$, and from the standpoint of moldability, it is more preferably 0.855 to 0.895 g/cm$^3$.

Preferably, the ethylene/alpha-olefin random copolymer has a crystallinity, determined by X-ray diffractometry, of not more than 40%. In view of the adhesion of the 4-methyl-1-pentene layer (A) to the interlayer (B), the preferred crystallinity of the ethylene/alpha-olefin random copolymer is not more than 35%.

The crystallinity of the ethylene/alpha-olefin random copolymer by X-ray diffractometry is determined by the following procedure.

The copolymer is compression-molded at 280° C. and 30 kg/cm$^2$ for 10 minutes. The molded product is cooled for 5 minutes by a cold press pressure 30 kg/cm$^2$) to prepare a test sample with a size of 2 cm×4 cm×1 mm). By using a rotating countercathode X-ray diffraction device RU-300, made by Rigaku Denki Co., Ltd.) equipped with a copper target, the X-ray diffraction curves of the test sample at a diffraction angle (2θ) of from 5 to 31° are measured. A base line is drawn between 2θ=6° and 2θ=30°. The area of the crystalline portion is calculated in % by weight and defined as the crystallinity of the sample.

The ethylene/alpha-olefin random copolymer used in this invention having the above properties can be produced by, for example, random-copolymerizing ethylene with an alpha-olefin using a catalyst comprising (1) a solid titanium catalyst composition obtained by treating (x) a highly active solid titanium catalyst component composed of a magnesium compound, a titanium compound and an electron donor wit (y) a halogenated hydrocarbon, (2) an organoaluminum compound, and (3) an electron donor comprising a silicon compound. A method for preparing such a catalyst is described, for example, in Japanese Laid-Open Patent Publications Nos. 811/1981 and 83006/1983. The polymerization conditions for the production of the ethylene/alpha-olefin random copolymer are described, for example, in Japanese Laid-Open Patent Publication No. 166310/1985.

The tackifier (c) used in this invention is a solid amorphous polymer which may be a tackifier resin generally used in the field of adhesive tapes, paints and hot-melt adhesives.

The tackifier resins may be, for example, resins obtained by using fractions resulting from cracking of petroleum and naphtha such as a C$_4$ fraction, a C$_5$ fraction, or a mixture of C$_4$ and C$_5$ fractions. Examples include aliphatic hydrocarbon resins prepared from isoprene and 1,3-pentadiene in a C$_5$ fraction as main materials; aromatic hydrocarbon resins prepared by using styrene derivatives and indenes in a C$_9$ fraction obtained by cracking petroleum and naphtha as main materials; aliphatic-aromatic copolymerized hydrocarbon resins obtained by copolymerizing any of C$_4$ and C$_5$ fractions with the C$_9$ fraction; alicyclic hydrocarbon resins obtained by hydrogenation of aromatic hydrocarbon resins; synthetic terpene hydrocarbon resins having an aliphatic, alicyclic and aromatic structure; terpene hydrocarbon resins prepared from alpha,beta-pinenes in terpene oil as materials; chroman-indene hydrocarbon resins prepared from indenes and styrenes in coal tar-type naphtha as materials; low-molecular-weight styrene resins; and rosin hydrocarbon resins.

Of these tackifiers, alicyclic hydrocarbon resins obtained by hydrogenating aliphatic hydrocarbons and aromatic hydrocarbons are preferred. Such a resin has excellent dispersibility in ethylene/alpha-olefin random copolymer.

Desirably used as such alicyclic hydrocarbon resins are those having a softening point (ring-and-ball method) of 105° to 150° C., preferably 110° to 140° C., and an aromatic ring hydrogenation ratio of at least 80%, preferably at least 85%.

The modified polyolefin (b) used in this invention is modified with an unsaturated carboxylic acid or its derivative. The modified polyolefin is preferably a modification product of a polymer of the same alpha-olefin as used in layer (A). The alpha-olefin polymer may be a homopolymer or a copolymer.

Examples of the unsaturated carboxylic acid or its derivative used as a modifier include acrylic unsaturated carboxylic acids such as acrylic acid, maleic acid, fumaric acid, tetrahydrophthalic acid, itaconic acid, citraconic acid, crotonic acid, isocrotonic acid and Nadic Acid ® (endocis-bicyclo[2.2.1hept-5-ene-2,3-dicarboxylic acid); derivatives of unsaturated carboxylic acids, for example acid halides, amides, imides, anhydrides and esters, such as malenyl chloride, maleimide, maleic anhydride, citraconic anhydride, monomethyl maleate, dimethyl maleate and glycidyl maleate.

Of these, the unsaturated dicarboxylic acids or the anhydrides thereof are preferred. Maleic acid, Nadic acid ® or the acid anhydrides are especially preferred.

Various known methods may be employed to produce the modified polyolefin (b) by graft-copolymerizing the grafting monomer selected from the aforesaid unsaturated carboxylic acids or their derivatives with the polyolefin. For example, there can be used a method comprising melting the polyolefin, adding the grafting monomer, and thereby graft co-polymerizing it to the polymer, or a method comprising adding the grafting monomer to a solution of the polyolefin in a solvent, and thereby graft co-polymerizing the monomer to the polyolefin.

In either case, the reaction is preferably carried out in the presence of a radical polymerization initiator in order to graft the grafting monomer to the polymer efficiently. Such a grafting reaction is usually carried out at a temperature of 60° to 350° C. The radical polymerization initiator is used usually in an amount of 0.001 to 1 part by weight per 100 parts by weight of the polyolefin.

Specific examples of the radical polymerization initiators include organic peroxides such as benzoyl peroxide, dichlorobenzoyl peroxide, dicumyl peroxide, di-tert-butyl peroxide, 2,5-dimethyl-2,5-di(peroxybenzoate)hexyne-3, 1,4-bis(tert-butylperoxyisopropyl)benzene, and lauroyl peroxide; organic peroxyesters such as tert-butyl peroxyacetate, 2,5-dimethyl-2,5-di(tert-butylperoxy)hexyne-3, 2,5-dimethyl-2,5-di(tert-butylperoxy)hexane, tert-butyl peroxybenzoate, tert-butylperoxyphenyl acetate, tert-butyl peroxyisobutyrate, tertbutyl peroxy-sec-octoate, tert-butyl peroxypivalate, cumyl peroxypivalate and tert-butyl peroxydiethylacetate; and azo compounds such as azobisisobutyronitrile and methylazoisobutyrate.

Preferred among these radical polymerization initiators are dialkyl peroxides such as dicumyl peroxide, di-tert-butyl peroxide, 2,5-dimethyl-2,5-di-(tert-butylperoxy)hexyne-3 and 2,5-dimethyl-2,5-di-(tert-butylperoxyisopropyl)benzene.

The ratio of grafting of the unsaturated carboxylic acid or its derivative in the modified polyolefin (b) is preferably about 0.01 to 10% by weight.

In the interlayer-forming composition used in the laminate of this invention, the ethylene/alpha-olefin random copolymer (a), the modified polyolefin (b) and the tackifier (c) are used in an amount of 40 to 98% by weight, preferably 50 to 90% by weight, 0.1 to 20% by weight, preferably 0.2 to 10% by weight, and 1 to 50% by weight, preferably 5 to 40% by weight, respectively, based on the total weight of these three components. The interlayer composition having such properties of its components has excellent moldability and adhesion.

The interlayer-forming composition may be prepared by mixing the ethylene/alpha-olefin random copolymer a), the tackifier (c) and the modified polyolefin (b) by means of, for example, a Henschel mixer, a V-type blender, a ribbon blender or a tumbler blender. Or after the above mixing, the mixture is melt-kneaded by a single-screw extruder, a twin-screw extruder, a kneader, a Banbury mixer, followed by granulation or pulverization.

In the laminate of this invention, a thermoplastic resin is used as layer (C).

The thermoplastic resin may advantageously be, for example, polyethylene, polypropylene, nylon, polycarbonate, ethylene/alpha-olefin copolymers, poly(4-methyl-pentene-1) polyacrylate, polymethyl methacrylate, polyvinyl chloride, polyvinylidene chloride, polystyrene, poly-p-xylylene, polyesters, and polyamides.

In the laminate of this invention, the layer (A) of the 4-methyl-1-pentene polymer is laminated to the thermoplastic resin layer (C) through the interlayer (B), and the layer (C) serves as a heat-sealing layer.

Various known methods may be used to prepare the laminate of this invention. For example, there can be used a method which comprises first forming the 4-methyl-1-pentene polymer layer, and then extrusion coating the interlayer-forming composition and the thermoplastic resin; a method which comprises first forming the 4-methyl-1-pentene polymer layer and then extrusion-laminating the separately formed thermoplastic resin layer to the 4-methyl-1-pentene polymer layer using the interlayer-forming composition; or a method which comprises co-extruding the 4-methyl-1-pentene polymer, the interlayer-forming composition and the thermoplastic resin with the interlayer-forming composition as an interlayer by using a multilayer die of three or more layers. Of these, the co-extruding method is most suitable because its operation is simple and convenient and can give a laminated film having excellent delamination strength. The co-extrusion may be carried out by a T-die method using a flat die or an inflation method using a circular die. The flat die may be of a single manifold type using a black box or a multimanifold type. Known dies may be used in the inflation method.

There is no particular restriction on the thicknesses of the individual layers of the laminate of this invention. The thickness of the 4-methyl-1-pentene polymer layer (A) is preferably 1 to 4000 micrometers, especially preferably 2 to 50 micrometers. The thickness of the interlayer B) is preferably 1 to 4000 micrometers, especially preferably 2 to 20 micrometers. The thermoplastic resin layer (C) has a thickness of preferably 1 to 4000 micrometers, especially preferably 2 to 50 micrometers.

The laminate of this invention is obtained by laminating the 4-methyl-1-pentene polymer layer (A), the interlayer B) and the thermoplastic resin layer (C) in this sequence. Accordingly, the laminate of this invention includes, for example, a three-layer laminate composed of layers (A), (B) and (C), a 5-layer laminate composed of the 4-methyl-1-pentene polymer layer (A) and a layer (C) of the thermoplastic resin laminated to each surface of the layer (A) through the interlayer (B), and laminates obtained by further laminating a polyvinylidene chloride resin, polyvinyl alcohol, a saponified copolymer of ethylene and vinyl acetate, a polyamide, a polyester, paper or an aluminum foil onto the above types of laminates in order to impart gas-barrier property.

As required, various conventional additives usually used for thermoplastic resins, such as weatherability stabilizers, heat stabilizers, antistatic agents, antihaze agents, antiblocking agents, slip agents, lubricants, pigments, dyes, and nucleating agents may be incorporated in one or more of the 4-methyl-1-pentene polymer layer (A), the interlayer (B) and the thermoplastic resin layer (C) constituting the laminate in amounts which do not impair the objects of this invention. The thermoplastic resin layer (C) may further include an ethylene/alpha-olefin copolymer such as a low-crystalline or amorphous ethylene/propylene copolymer or an ethylene/1-butene copolymer, or an ethylene/vinyl acetate copolymer in order to improve its heat sealability.

Since the laminate of this invention is characterized by lamination of the 4-methyl-1-pentene polymer layer (A) and the thermoplastic resin layer (C) through the interlayer (B), it has excellent thermal resistance, delamination strength, heat sealability, chemical resistance and mechanical strength.

By utilizing the above properties, the laminate of this invention ca be favorably used as an industrial mold-releasing film, a drug-holding bag and a food packaging material (a retortable pouch, etc.)

The following examples illustrate the present invention in more detail. It should be understood that the invention is not at all limited by these examples.

EXAMPLE 1

As a composition (adhesive resin composition AD-1) for forming an interlayer (B), 88 parts by weight of an ethylene/propylene random copolymer (EPR-1) ethylene content 80 mole %, $MFR_2$ 1.2 g/10 min., density 0.88 g/cm$^3$, crystallinity 6%), 2 parts by weight of maleic anhydride-grafted high-density polyethylene (MAH-HDPE) grafting ratio of maleic anhydride 2.1 g/100 g of polymer, MFR 190° C., load 2 16 kg) 2.4 g/10 min., density 0.960 g/cm$^3$, crystallinity 76%), and 10 parts of alicyclic hydrogenated petroleum resin (tackifier under the tradename ARCON P125, softening point 125° C., bromine value 2, a product of Arakawa Chemical Co., Ltd.) were mixed in a tumbler. The mixture was kneaded and granulated in a single-screw extruder dulmage screw, 40 mm in diameter) kept at 200° C. to knead and granulate it.

As a resin for forming layer (A), 4-methyl-1-pentene/1-decene copolymer (4MP-1; density 0.835 g/cm$^3$MFR$_5$ 26 g/10 min.) was used.

High-pressure polyethylene LDPE-1, Tm 105° C.) was used as a resin for forming the thermoplastic resin layer (C).

The 4-methyl-1-pentene/1-decene copolymer (4MP-1) was melted in an extruder (cylinder diameter 40 mm; cylinder temperature 270° C.); the interlayer-forming composition (AD-1), in an extruder (cylinder diameter 40 mm; cylinder temperature 250° C.); and the high-pressure polyethylene (LDPE-1), in an extruder (cylinder diameter 40 mm; cylinder temperature 250° C.). The molten masses were co-extruded through a coat-hanger die (die temperature 260° C.) of a three-layer T-die film former. The extrudate was cooled to give a co-extruded three-layer film laminate) composed of layer (A) (4MP-1, thickness 20 micrometers), an interlayer (B) (AD1, thickness 20 micrometrs) and layer (C) (LDPE, thickness 20 micrometers).

The properties of the resulting laminate were evaluated by the following methods. The results are shown in Table 1.

Adhesion strength (g/15 mm)

A test piece with a width of 15 mm was cut out from the laminate. The test piece was peeled between the resin layers at a crosshead speed of 300 mm/min. The strength at peeling delamination strength) was measured.

Peel strength of the heat-sealed portion (g/15 mm)

The thermoplastic resin layer (C) of the above laminate was laid over itself, and heat-sealed at a temperature of 120°, 150° and 180° C. respectively under a pressure of 2 kg/cm² for 1 second by means of a seal bar with a width of 10 mm, followed by spontaneous cooling. A test piece with a width of 15 mm was cut out from the resulting laminate. The heat-sealed portion of the test piece was peeled at a crosshead speed of 300 mm/min. The strength at peeling was measured.

EXAMPLE 2

Example 1 was repeated except that instead of the high-pressure polyethylene (LDPE-1), propylene random copolymer [tradename Polypropylene F651, a product of Mitsui Petrochemical Industries Ltd. abbreviated as PP; MFR (230° C., 2.16 kg) 9 g/10 min.] was used. The results are shown in Table 1.

EXAMPLE 3

Example 1 was repeated except that low-pressure method polyethylene (Hizex 3000F, a tradename for a product of Mitsui Petrochemical Industries, Ltd.; abbreviated as HDPE) was used instead of LDPE-1. The results are shown in Table 1.

EXAMPLE 4

Example 1 was repeated except that polyamide resin, nylon-6 (Toray Nylon 6, CM1021, a tradename for a product of Toray Inc: NY for short) was used instead of LDPE-1. The results are shown in Table 1.

EXAMPLE 5

Example 1 was repeated except that an ethylene/vinyl alcohol copolymer resin (Kuraray Eval EP-E, a tradename for a product of Kuraray Inc.; to be abbreviated as EVOH) was used instead of LDPE-1. The results are shown in Table 1.

EXAMPLE 6

Example 1 was repeated except that polycarbonate resin (Teijin Panlite L1250, a tradename for a product of Teijin Chemical CO., Ltd.; abbreviated as PC) was used instead of LDPE-1. The results are shown in Table 1.

TABLE 1

| | Example | 1 | 2 | 3 | 4 | 5 | 6 | Remarks |
|---|---|---|---|---|---|---|---|---|
| Structure | 4-methyl-1-pentene polymer layer (A) | 4MP-I | 4MP-I | 4MP-I | 4MP-I | 4MP-I | 4MP-I | T-die method Black box |
| | Interlayer (B) | AD-I | AD-I | AD-I | AD-I | AD-I | AD-I | |
| | Thermoplastic resin layer (C) | LDPE | PP | HDPE | NY | EVOH | PC | |
| Thickness (μ) | (A)/(B)/(C) | 20/20/20 | 20/20/20 | 20/20/20 | 20/20/20 | 20/20/20 | 20/20/20 | |
| Tensile strength (MD/TD) (*) | Stress at yield (kg/cm²) | 100/100 | 145/135 | 150/170 | 190/180 | 280/250 | 310/310 | Test speed = 200 mm/min. |
| | Stress at break (kg/cm²) | 180/140 | 215/190 | 330/290 | 390/420 | 380/320 | 400/330 | Specimen shape = JIS K6781 |
| | Young's modulus (kg/cm²) | 5500/5000 | 7400/6900 | 6700/7400 | 8400/8500 | 16200/13300 | 14300/14500 | Chack distance = 86 mm |
| | Elongation at break (%) | 190/270 | 250/300 | 700/770 | 290/360 | 190/190 | 90/60 | |
| Thermal shrinkage (%) MD/TD (*) | 140° C., 30 minutes | −3.10/0.98 | −2.02/0.69 | −2.50/0.63 | −0.41/0.48 | −1.12/1.51 | −0.61/0.52 | Air oven — value = elongation + value = shrinkage |
| | 160° C., 30 minutes | −3.50/1.51 | −2.82/1.15 | −3.86/1.12 | −0.61/0.67 | −1.83/1.69 | −0.80/0.73 | |
| | 180° C., 30 minutes | melted | −3.20/1.60 | melted | −0.47/0.76 | −2.42/2.67 | −5.1/1.70 | |
| | 200° C., 30 minutes | melted | −5.12/3.16 | melted | −0.86/−3.52 | −4.0/+3.51 | −6.5/2.30 | |
| Heat seal strength (g/15 mm) | 120° C. | 1100 (SB) () | | | | | | (*) Heat-seal conditions pressure = 2 kg/cm² time = 1 sec. |
| | 160° C. | 1250 (SB) | 1550 (SB) | 1350 (SB) | | | | |
| | 180° C. | | 1700 (SB) | 1450 (SB) | | | | |
| Delamination strength (g/cm) | Layer (A)/interlayer (B) | 750 | 850 | 700 | peeling impossible | 650 | 700 | (***) |
| | Interlayer (B)/layer (C) | peeling impossible | peeling impossible | peeling impossible | peeling impossible | peeling impossible | peeling impossible | |

(*): MD = machine direction; TD = transverse direction
(**): SB = substrate broken
(***): Measured by the T-peel method.

We claim:
1. A laminate comprising
   (a) a layer of a 4-methyl-1-pentene polymer,
   (b) a layer of a polymer composition comprising
      (a) 40 to 98% by weight of an ethylene/alpha-olefin random copolymer containing 30 to 95 mole % of ethylene units,

(b) 0.1 to 20% by weight of a polyolefin modified with an unsaturated carboxylic acid or its acid halide, amide, imide or anhydride, and (c) 1 to 50% by weight of a tackifier, the proportions of components (a), (b) and (c) being based on the total weight of components (a), (b) and (c), and (C) a layer of a thermoplastic resin, the layers (A), (B) and (C) being laminated in the sequence stated.

2. The laminate of claim 1 in which the 4-methyl-1-pentene polymer is a homopolymer of 4-methyl-1-pentene or a copolymer of 4-methyl-1-pentene with another alpha-olefin.

3. The laminate of claim 1 in which the ethylene/alpha-olefin random copolymer (a) is a random copolymer of ethylene with an alpha-olefin having 3 to 30 carbon atoms.

4. The laminate of claim 1 in which the modified polyolefin (b) is a 4-methyl-1-pentene polymer graft-modified with the unsaturated carboxylic acid or its acid halide, amide, imide or anhydride.

5. The laminate of claim 4 in which the unsaturated carboxylic acid is selected from the group consisting of acrylic acid, maleic acid, fumaric acid, tetrahydrophthalic acid, itaconic acid, citraconic acid, crotonic acid, isocrotonic acid and endocis-bicyclo-[2.2.1]hept-5-ene-2,3-dicarboxylic acid.

6. The laminate of claim 1 in which the tackifier (c) is selected from the group consisting of aliphatic hydrocarbon resins, aromatic hydrocarbon resins, aliphatic-aromatic copolymerized hydrocarbon resins, alicyclic hydrocarbon resins, terptene hydrocarbon resins, synthetic terpene hydrocarbon resins, chroman-indene hydrocarbon resins and rosin hydrocarbon resins.

7. The laminate of claim 1 in which the thermoplastic resin in layer (C) is selected from the group consisting of polyethylene, polypropylene, nylon, polycarbonates, ethylene/alpha-olefin copolymer, poly-(4l-methyl-pentene-1), polyacrylate, polymethyl methacrylate, polyvinyl chloride, polyvinylidene chloride, polystyrene, poly-p-xylene, polyesters and polyamides.

8. The laminate of claim 1 wherein the layer (B) is comprised of a polymer composition comprising (a) 50 to 90% by weight of said ethylene/alpha-olefin random copolymer, (b) 0.2 to 10% by weight of said modified polyolefin and (c) 5 to 40% by weight of said tackifier.

9. The laminate of claim 8 wherein the ethylene/alpha-olefin random copolymer (a) is a random copolymer of ethylene with an alpha/olefin having 3 to 30 carbon atoms, a melt flow rate, determined at 190° C., under a load of 2.16 kg, of 2 to 50 g/10 min, a density of from 0.855 to 0.895 g/cm$^3$, and a crystallinity of not more than 35%.